(12) United States Patent
Nakamura et al.

(10) Patent No.: US 7,183,011 B2
(45) Date of Patent: *Feb. 27, 2007

(54) MAGNETIC RECORDING MEDIUM

(75) Inventors: Miyabi Nakamura, Ibaraki (JP);
Takahiro Shimizu, Nagano (JP);
Hiroyuki Uwazumi, Nagano (JP);
Naoki Takizawa, Nagano (JP); Tadaaki Oikawa, Nagano (JP)

(73) Assignee: Fuji Electric Co., Ltd. (JP)

( * ) Notice: Subject to any disclaimer, the term of this patent is extended or adjusted under 35 U.S.C. 154(b) by 443 days.

This patent is subject to a terminal disclaimer.

(21) Appl. No.: 10/346,838

(22) Filed: Jan. 17, 2003

(65) Prior Publication Data
US 2004/0027868 A1   Feb. 12, 2004

(30) Foreign Application Priority Data
Jan. 17, 2002   (JP) .............................. 2002-009160

(51) Int. Cl.
*G11B 5/64* (2006.01)
(52) U.S. Cl. .................................. 428/831.2; 428/831
(58) Field of Classification Search ................ 428/611, 428/679, 65.4, 65.5, 336, 694 TS, 694 T, 428/694 TM, 900, 831, 831.2, 833.3
See application file for complete search history.

(56) References Cited

U.S. PATENT DOCUMENTS

| | | | |
|---|---|---|---|
| 4,722,869 A | 2/1988 | Honda et al. ................. | 428/611 |
| 5,049,451 A | 9/1991 | Lal et al. ..................... | 428/611 |
| 5,679,473 A | 10/1997 | Murayama et al. ......... | 428/694 T |
| 5,736,262 A | 4/1998 | Ohkijima et al. ............ | 428/611 |
| 5,815,342 A | 9/1998 | Akiyama et al. ............ | 360/97.01 |
| 5,981,039 A | 11/1999 | Isono et al. .................. | 428/199 |
| 5,981,054 A | 11/1999 | Hikosaka et al. ............ | 428/328 |
| 6,086,974 A | 7/2000 | Thiele et al. ................ | 428/65.3 |
| 6,183,893 B1 | 2/2001 | Futamoto et al. ........... | 428/694 TS |
| 6,248,416 B1 | 6/2001 | Lambeth et al. ............ | 428/65.3 |
| 6,416,839 B1 | 7/2002 | Xuan et al. ................. | 428/65.4 |

(Continued)

FOREIGN PATENT DOCUMENTS

EP   0 287280 A2   10/1988

(Continued)

OTHER PUBLICATIONS

Oikawa et al—High Performance CoPtCrO Single Layered Perpendicular Media with No Recording Demagnetization (IEEE Transactions on Magnetics, vol. 36, No. 5, Sep. 2000, pp. 2393-2395).*

(Continued)

*Primary Examiner*—Stevan A. Resan
*Assistant Examiner*—Louis Falasco
(74) *Attorney, Agent, or Firm*—Rossi, Kimms & McDowell LLP

(57) ABSTRACT

A magnetic recording medium for perpendicular magnetic recording system includes a nonmagnetic substrate and layers sequentially laminated on the substrate. The layers include a seed layer comprised of a metal or an alloy with a face centered cubic crystal structure, a nonmagnetic underlayer of a metal or an alloy with a hexagonal closest packed crystal structure, a magnetic layer having a granular structure including ferromagnetic crystalline grains with a hexagonal closest packed structure and nonmagnetic grain boundary region of mainly oxide surrounding the crystalline grains, a protective layer, and a liquid lubricant layer.

18 Claims, 2 Drawing Sheets

U.S. PATENT DOCUMENTS

| | | |
|---|---|---|
| 6,447,936 B1 | 9/2002 | Futamoto et al. ..... 428/694 TM |
| 6,524,724 B1 | 2/2003 | Cheng et al. ................ 428/611 |
| 6,589,669 B2 | 7/2003 | Uwazumi et al. ........... 428/611 |
| 6,602,620 B1 | 8/2003 | Kikitsu et al. ........... 428/694 T |
| 6,638,648 B2 | 10/2003 | Yamamoto et al. ... 428/694 TM |
| 6,667,116 B1 | 12/2003 | Uwazumi et al. ...... 428/694 TS |
| 6,682,826 B2 | 1/2004 | Shimizu et al. ............. 428/611 |
| 6,716,543 B2 | 4/2004 | Uwazumi et al. ...... 428/694 TS |
| 6,794,028 B2* | 9/2004 | Uwazumi et al. .... 428/694 TM |
| 6,884,520 B2* | 4/2005 | Oikawa et al. ............. 428/611 |
| 2001/0012573 A1 | 8/2001 | Kaitsu et al. |
| 2001/0027868 A1 | 10/2001 | Carisella ..................... 166/387 |
| 2001/0038932 A1 | 11/2001 | Uwazumi et al. |
| 2002/0018917 A1 | 2/2002 | Sakai et al. .......... 428/694 TM |
| 2002/0058159 A1 | 5/2002 | Kubota et al. ....... 428/694 TM |
| 2002/0058160 A1 | 5/2002 | Oikawa et al. ........ 428/694 TS |
| 2003/0049495 A1 | 3/2003 | Sakai et al. .......... 428/694 TM |
| 2003/0064253 A1 | 4/2003 | Uwazumi et al. ...... 428/694 TP |
| 2003/0152809 A1 | 8/2003 | Oikawa et al. ............. 428/694 |
| 2003/0157375 A1 | 8/2003 | Uwazumi et al. ...... 428/694 TP |
| 2004/0043258 A1 | 3/2004 | Yamamoto et al. ... 428/694 TM |

FOREIGN PATENT DOCUMENTS

| | | |
|---|---|---|
| JP | 63-201913 A | 8/1988 |
| JP | 02-227814 A | 9/1990 |
| JP | 02-287918 A | 11/1990 |
| JP | 8-83418 A | 3/1996 |
| JP | 8-255342 A | 10/1996 |
| JP | 11-134634 A | 5/1999 |
| JP | 2000-322726 A | 11/2000 |
| JP | 2001-283427 A | 10/2001 |
| JP | 2002-25031 A | 1/2002 |
| JP | 2003-77122 A | 3/2003 |
| JP | 2003-178412 A | 6/2003 |

OTHER PUBLICATIONS

Relevant portion of Japanese Office Action of corresponding Japanese Application 2002-009160.

Relevant portion of Japanese Office Action of corresponding Japanese Application 2001-374897.

Search and Examination Report (Austrian Patent Office) for corresponding Singapore Patent Application No. 200207316-1 dated Dec. 21, 2005; 10 pages.

US RE37,748, 06/2002, Chen et al. (withdrawn)

* cited by examiner

MAGNETIC RECORDING MEDIUM

BACKGROUND

The present invention relates in general to a magnetic recording medium and in particular to a magnetic recording medium for a perpendicular magnetic recording system that is mounted on magnetic recording equipment such as external storage devices of computers.

A perpendicular magnetic recording system is drawing attention as an alternative to a conventional longitudinal magnetic recording system for attaining higher recording density.

A crystalline film of CoCr alloy system is now mainly studied as a material for a magnetic recording layer of a perpendicular magnetic recording medium. In order to use in perpendicular magnetic recording, the crystal orientation is controlled such that c-axis of the CoCr alloy system having hcp structure aligns perpendicular to the film surface (c-plane is parallel to the film surface). In order to achieve higher density in the CoCr alloy system in the future, attempts are being made for finer grain size, reduction of dispersion of grain size distribution, and decrease in magnetic interaction between grains.

A method for controlling a magnetic recording layer structure to raise recording density in a longitudinal recording medium has been disclosed, for example, in Japanese Unexamined Patent Application Publication No. H8-255342 and U.S. Pat. No. 5,679,473. A magnetic layer in these references, generally called a granular magnetic layer, has a structure in which magnetic crystalline grains are surrounded by nonmagnetic and nonmetallic substance such as an oxide or a nitride. Because the nonmagnetic and nonmetallic grain boundary phase physically separates the magnetic particles in the granular magnetic film, magnetic interaction between the magnetic particles decreases and formation of a zigzag-shaped magnetic domain wall in a transition region of a recording bit is suppressed. A low noise characteristic is considered to be attained for this reason.

Combining the above techniques together, the granular magnetic layer is proposed to apply to a recording layer of a perpendicular magnetic recording medium. IEEE Trans. Mag., Vol. 36, p 2393 (2000), for example, discloses a perpendicular magnetic recording medium comprising a ruthenium underlayer and a magnetic layer of CoPtCrO alloy having a granular structure. Here, superior magnetic characteristic and electromagnetic conversion characteristic are obtained as a result of the improvement in c-axis alignment by increasing the thickness of the ruthenium layer, which is an underlayer for the granular magnetic layer, to more than about 40 nm.

Japanese Unexamined Patent Application Publication No. 2001-264517 discloses a perpendicular magnetic recording medium comprising a nonmagnetic underlayer comprised of a metal or an alloy having a hexagonal closest packed (hcp) crystal structure and a seed layer comprised of a metal or an alloy having a face centered cubic crystal structure disposed beneath the underlayer. Such a structure provided an excellent perpendicular magnetic recording medium even in the case of a very thin film of the underlayer or a very thin total thickness of the underlayer and the seed layer.

In order to accomplish a perpendicular magnetic recording medium with excellent electromagnetic conversion characteristic using a granular magnetic layer, the oxide such as $SiO_2$ and the cobalt alloy that are contained in the target need to be well separated in the laminated magnetic film. It is also important to suppress the grain size distribution including extraordinary fine or expanded particles, for reducing noises.

Indeed low noise may be achieved by the structure in which the nonmagnetic and nonmetallic grain boundary region physically separates the magnetic grains. Nevertheless, if a nonmagnetic underlayer is deposited using a material with hexagonal closest packed or body centered cubic structure that has a spacing of lattice planes different from that of the crystals in the magnetic layer by a relative proportion over 15%, the grain size of the magnetic grains in the magnetic layer cannot be controlled without difficulty by depositing the magnetic layer on such a nonmagnetic underlayer because of inferior lattice matching between the underlayer and the crystal grains in the magnetic layer. That is, to accomplish further low noise in a magnetic recording medium, it is required to precisely control minute and uniform grain size of the magnetic crystalline grains.

In view of the above, it would be desirable to provide a magnetic recording medium for perpendicular recording system that allows effective suppression of magnetic interaction between the magnetic grains by facilitating control of reduction of grain size and deviation thereof.

SUMMARY OF THE INVENTION

A magnetic recording medium for a perpendicular magnetic recording system according to the invention comprises a nonmagnetic substrate and layers sequentially laminated on the substrate, the layers including a seed layer comprised of a metal or an alloy with a face centered cubic lattice structure disposed over the substrate, a nonmagnetic underlayer comprised of a metal or an alloy with a hexagonal closest packed crystal structure, a magnetic layer having a granular structure consisting of ferromagnetic crystalline grains with a hexagonal closest packed structure and nonmagnetic grain boundary region of mainly oxide surrounding the ferromagnetic crystalline grains, a protective layer, and a liquid lubricant layer.

Preferably, a degree of mismatching between an a-axis lattice constant of the nonmagnetic underlayer and an a-axis lattice constant of the magnetic layer is not larger than 10%, and the underlayer is comprised of a metal selected from Re, Ru, and Os, or an alloy mainly comprised of one or more metals selected from Ru, Os, and Re.

Preferably, a proportion of crystalline grains larger than 8 nm in the nonmagnetic underlayer is not larger than 10% of whole crystalline grains in the nonmagnetic underlayer, and a standard deviation of the grain sizes of the crystalline grains is at most 1.4 nm.

Preferably, the seed layer is comprised of a metal selected from Cu, Au, Pd, Pt, and Ir or an alloy mainly comprised of one or more metals selected from Cu, Au, Pd, Pt, and Ir, or an alloy mainly comprised of Ni and Fe.

A magnetic recording medium of the invention preferably further comprises a nonmagnetic alignment control layer under the seed layer and the nonmagnetic alignment control layer is comprised of a metal or an alloy with the body centered cubic crystal structure or an amorphous structure.

The nonmagnetic alignment control layer is preferably comprised of a nonmagnetic metal selected from Nb, Mo, Ta, and W or an alloy mainly comprised of one or more metals selected from Nb, Mo, Ta, and W.

BRIEF DESCRIPTION OF THE DRAWINGS

The invention will be described in greater detail with reference to certain preferred embodiments thereof along with the accompanying figures, wherein.

DETAILED DESCRIPTION OF THE PREFERRED EMBODIMENTS

Figure 1:
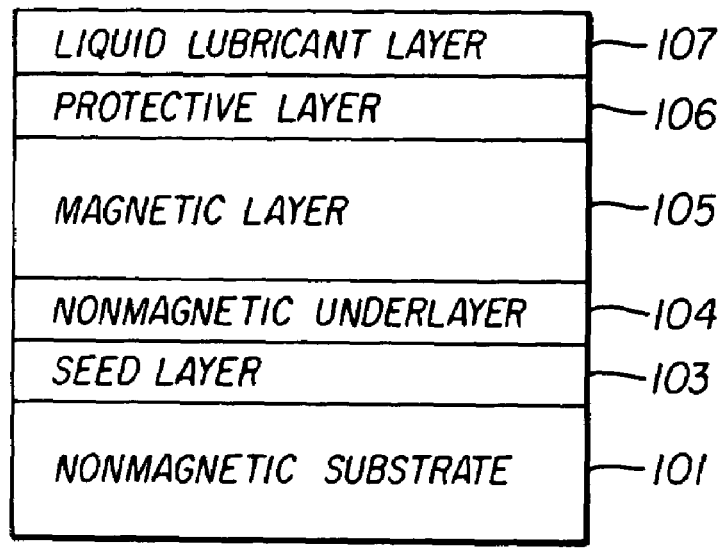
FIG. 1 is a schematic cross sectional view of an embodiment of a magnetic recording medium according to the present invention.

The inventors of the present invention have studied on noise reduction by grain size control of the granular magnetic layer in a magnetic recording medium as described above and found the following fact. In the process of depositing the magnetic layer, a cobalt grain grows corresponding to a crystalline phase in the nonmagnetic underlayer with a hexagonal closest packed structure, which is the same as the structure of the ferromagnetic crystalline grain in the magnetic layer, and an oxide precipitates corresponding to a porous region or an amorphous phase in the underlayer. Consequently, excellent performances can be achieved by controlling the grain size of the nonmagnetic underlayer.

Crystalline grains are epitaxially grown from crystalline grains of the nonmagnetic underlayer fabricated by sputtering. As a result, the crystal growth of the magnetic layer can be controlled by the crystalline grains of the nonmagnetic underlayer, holding the alignment. At the same time, by the amorphous phase surrounding the crystalline grains, the structure of the magnetic layer film are controlled, to obtain a magnetic recording medium with excellent performances.

This nonmagnetic underlayer provided under the granular magnetic layer controls the crystal structure and the texture of the magnetic layer by difference in growth mechanism of the thin films between on the crystalline grain and on the amorphous region in the underlayer. Accordingly, the nonmagnetic underlayer preferably has a columnar structure in the thickness direction and a porous or granular structure. The degree of mismatching between an a-axis lattice constant of the crystalline grain of the nonmagnetic underlayer and an a-axis lattice constant of the crystalline grain of the magnetic layer is necessarily not larger than 10%. In that degree of mismatching, continuity of the crystal lattice can be held in the epitaxial growth of the magnetic layer film from the crystalline grains of the nonmagnetic underlayer. When the grain sizes of the crystalline grains of the nonmagnetic underlayer is controlled such that the proportion of the grains larger than 8 nm is not more than 10% of the whole crystalline grains in the underlayer, and the standard deviation of the grain sizes is not more than 1.4 nm, the crystalline grains in the magnetic layer with excessively fine or expanded grain size decrease, to obtain a medium with low noise.

In order to principally control alignment in forming the granular magnetic layer comprising ferromagnetic crystalline grains of a CoPt alloy with a hexagonal closest packed (hcp) structure, the nonmagnetic underlayer is comprised of a metal or an alloy with the hcp crystal structure, and a seed layer comprised of a metal or an alloy with a face centered cubic (fcc) crystal structure is further provided under the underlayer. By virtue of this structure, the nonmagnetic region and the ferromagnetic crystalline grains in the granular magnetic layer that is laminated above those layers are improved in c-axis alignment in the vertical direction with respect to the film surface, to obtain more effect.

Because a perpendicular magnetic recording medium with excellent performances can be easily obtained by taking this layer structure, substrate heating is not required on laminating a medium of the invention. Consequently, simplification and cost reduction of the manufacturing process can be achieved. Moreover, a substrate can be made using plastic, which is inexpensive substance, as well as conventional aluminum and glass substrates.

Figure 2:
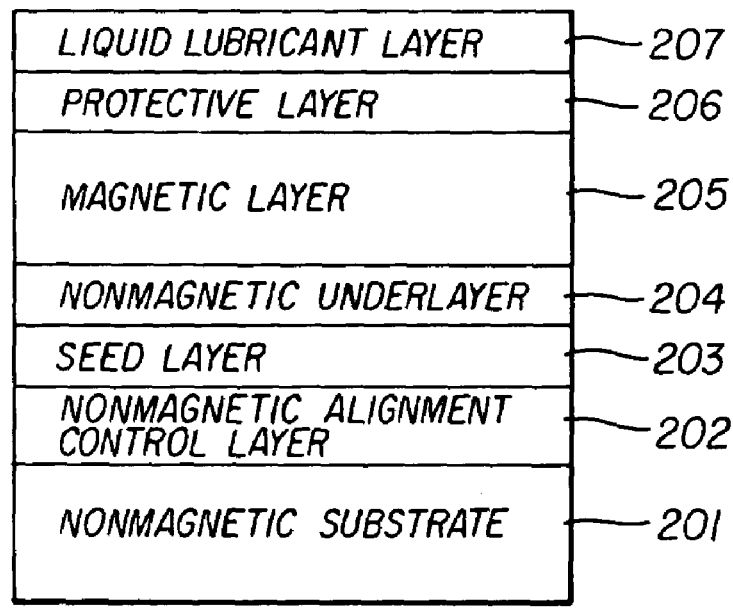
FIG. 2 is a schematic cross sectional view of another embodiment of a magnetic recording medium according to the present invention.

FIG. 1 and FIG. 2 are schematic cross sectional views illustrating the construction of magnetic recording media according to the present invention. FIG. 1 is a schematic cross sectional view of a perpendicular magnetic recording medium of an embodiment of the invention. The perpendicular magnetic recording medium comprises a nonmagnetic substrate 101; and a seed layer 103, a nonmagnetic underlayer 104, a magnetic layer 105, a protective layer 106, and a liquid lubricant layer 107 sequentially formed on the substrate 101.

A perpendicular magnetic recording medium of another embodiment of the invention is also disclosed here that comprises a nonmagnetic substrate 204; and a nonmagnetic alignment control layer 202, a seed layer 203, a nonmagnetic underlayer 204, a magnetic layer 205, a protective layer 206, and a liquid lubricant layer 207 sequentially laminated on the substrate 201.

Nonmagnetic substrate 101 and 201 can be made of a NiP-plated aluminum alloy, strengthened glass, or crystallized glass, which is used in a usual magnetic recording medium. Because substrate heating is not required, a substrate can also be used that is made by injection molding a plastic resin, such as polycarbonate or polyolefin.

The magnetic layer 105 and 205 is a so-called granular magnetic layer that consists of ferromagnetic crystalline grains and nonmagnetic grain boundary region comprised of an oxide or a nitride of a metal surrounding the ferromagnetic crystalline grains. Such a structure can be fabricated by deposition employing a sputtering method using a target of a ferromagnetic metallic substance containing an oxide constituting the nonmagnetic grain boundary region, for example. The granular structure can alternatively be deposited by a reactive sputtering method in an argon gas containing oxygen using a target of a ferromagnetic metallic substance.

A CoPt alloy is favorable for the material composing the ferromagnetic crystalline grains. A CoPt alloy containing an additive element selected from Cr, Ni, and Ta is particularly desirable to reduce media noise. For the material composing the nonmagnetic grain boundary region, an oxide of at least an element selected from Cr, Co, Si, Al, Ti, Ta, Hf, and Zr is desirable to form a stable granular structure. The magnetic layer needs a thickness that allows sufficient head output and resolution at read-back of records.

The protective layer 106 and 206 can be a thin film mainly comprised of carbon, for example. The liquid lubricant layer 107 and 207 can be made of perfluropolyether lubricant, for example.

The seed layer 103 and 203 and the nonmagnetic underlayer 104 and 204 are described in the following. The nonmagnetic underlayer is necessarily comprised of a metal or an alloy with a hexagonal closest packed (hcp) crystal structure. Preferable material includes a metal selected from Re, Ru, and Os, or an alloy mainly comprised of one or more elements selected from Re, Ru, and Os for controlling alignment of the granular magnetic layer. The degree of mismatching between the a-axis lattice constant of the nonmagnetic underlayer and the a-axis lattice constant of the magnetic layer is preferably not larger than 10%. The seed layer is preferably comprised of a metal or an alloy with the face centered cubic (fcc) lattice structure. Specifically, the seed layer is preferably comprised of a metal selected from Cu, Au, Pd, Pt, and Ir, an alloy mainly comprised of one or more metals selected from Cu, Au, Pd, Pt, and Ir, or an alloy mainly comprised of Ni and Fe.

When the seed layer with the fcc lattice structure is deposited on the substrate, fcc (111) plane, which is the closest packed lattice plane, tends to grow aligning parallel to the film surface. When the nonmagnetic underlayer, which has the fcc structure in the invention, is deposited on the seed layer aligning along the fcc (111) plane, hcp (002) plane of the underlayer, which takes the best matching with the seed layer, tends to grow aligning parallel to the film surface. When the granular magnetic layer is deposited on this nonmagnetic underlayer, the metallic crystalline grains in the magnetic layer grows with hcp (002) plane aligning parallel to the film surface, as well. Thus, an excellent perpendicular magnetic recording medium can be obtained.

When the material for the seed layer is selected from a metal including Cu, Au, Pd, Pt, and Ir, an alloy mainly comprised of one or more metals selected from Cu, Au, Pd, Pt, and Ir, and an alloy mainly comprised of Ni and Fe, and at the same time, the material for the nonmagnetic underlayer is selected from a metal including Ti, Re, Ru, and Os, and an alloy mainly comprised of one or more metals selected from Ti, Re, Ru, and Os, then the lattice matching between the seed layer and the nonmagnetic underlayer and the lattice matching between the nonmagnetic underlayer and the granular magnetic layer are more favorable. Thus, superior perpendicular magnetic recording medium can be obtained.

Thickness of the seed layer is favorably at least 3 nm, more favorably at least 5 nm for controlling alignment of the nonmagnetic underlayer. In a double layer perpendicular magnetic recording medium that is provided with a soft magnetic backing layer under the seed layer, in particular, the distance between the recording layer and the soft magnetic backing layer is desired as thin as possible. Accordingly, the thickness of the seed layer is required thinnest as long as the alignment is well controlled.

Thickness of the nonmagnetic underlayer is favorably at least 2 nm, more favorably at least 5 nm for controlling alignment of the granular magnetic layer. For the purpose of decreasing the distance between the recording layer and the soft magnetic backing layer in the case of the double layer perpendicular magnetic recording medium, and also for reduction of manufacturing cost, the thickness of the nonmagnetic underlayer is desired thinnest as long as the alignment is well controlled.

A double layer perpendicular magnetic recording medium may be produced using a NiFe soft magnetic alloy with an fcc structure for a soft magnetic backing layer, or providing a thin film of the like NiFe soft magnetic alloy on the uppermost portion of the soft magnetic backing layer. Alignment control of the nonmagnetic underlayer can be performed by regarding these fcc alloy film as a seed layer. The distance between the recording layer and the soft magnetic backing layer can be made thin essentially to the thickness of the nonmagnetic underlayer. Thus, more favorable perpendicular magnetic recording medium can be produced.

The nonmagnetic alignment control layer 202 is described below. The nonmagnetic alignment control layer is necessarily comprised of a metal or an alloy with a body centered cubic (bcc) lattice structure or an amorphous structure. By providing such a layer, the fcc (111) alignment of the seed layer is more enhanced leading to better alignment of the nonmagnetic underlayer, through which performances of the magnetic layer can be improved. This effect is fully achieved by using a material with a bcc lattice structure, specifically a nonmagnetic metal selected from Nb, Mo, Ta, and W, or a nonmagnetic alloy mainly comprised of one or more metals selected from Nb, Mo, Ta, and W. Materials with an amorphous structure including NiP and CoZr are also favorable.

The thickness of the nonmagnetic alignment control layer is favorably at least 3 nm, more favorably at least 5 nm for controlling alignment of the seed layer.

Production process of a magnetic recording medium having a layer structure as described above and shown in FIG. 1 or FIG. 2 may omit a substrate heating step that is essential in a conventional magnetic recording medium. Because an excellent perpendicular magnetic recording medium can be obtained even if the heating step is omitted, the production process can be simplified and the production cost can be reduced. No need for the substrate heating allows the use of a nonmagnetic substrate of a resin material, such as polycarbonate, polyolefin, or the like.

Some examples of preferred embodiments of the present invention will be described in more detail with reference to the accompanying drawings.

EXAMPLE 1

A resin substrate of 3.5" diameter disk was used for a nonmagnetic substrate. After cleaning, the substrate was introduced into a sputtering apparatus. A nonmagnetic alignment control layer of amorphous NiP 5 nm thick was deposited under the argon gas pressure of 5 mTorr. After forming a seed layer of platinum with the 5 nm thickness, a nonmagnetic underlayer 20 nm thick was deposited at the rate of 2.3 nm/sec under the discharging argon gas pressure of 30 mTorr. The nonmagnetic underlayer was formed using a titanium alloy containing 10 at % of Cr, Ta, Re, or Ru. Subsequently, a granular magnetic layer 30 nm thick was formed by an RF sputtering method using a target of $Co_{76}Cr_{12}Pt_{12}$ containing 10 mol % of $SiO_2$ under the discharging argon gas pressure of 5 mTorr.

After laminating a carbon protective layer 8 nm thick, the laminated substrate was taken out from the vacuum chamber. Finally, liquid lubricant was applied to form a liquid lubricant layer 1.5 nm thick. Thus, a magnetic recording medium as shown in FIG. 2 was produced. Substrate heating before the deposition process was not executed.

Table 1 shows magnetic properties, electromagnetic conversion characteristics, and $\Delta\theta_{50}$ measured by X-ray diffraction (XRD) of the magnetic recording medium of Example 1. The table shows an electromagnetic conversion characteristic and alignment performance to compare effects to the media performance caused by differences in the nonmagnetic underlayer.

TABLE 1

| underlayer | Hc (Oe) | S | SNR (dB) | $\Delta\theta50$ |
|---|---|---|---|---|
| Ti-10 at % Cr | 2,060 | 0.78 | 13.9 | 10.6 |
| Ta | 1,220 | 0.25 | 10.2 | 21.9 |
| Re | 4,900 | 0.89 | 16.0 | 5.0 |
| Ru | 4,800 | 0.95 | 15.7 | 5.2 |

Specifically, Table 1 gives coercive force Hc and squareness ratio S of the produced media measured by a vibrating sample magnetometer VSM, the signal-to-noise ratio SNR as a recording performance measured at the linear recording density of 400 kFCI by a spinning stand tester equipped with a GMR head, and a half width $\Delta\theta_{50}$ of a rocking curve of the hcp (002) diffraction line of the magnetic layer obtained by an X-ray diffraction method. The evaluation results demonstrated that Hc, SNR, and alignment have improved with the underlayers of Re and Ru in which the degree of mismatching between the a-axis lattice constant of the nonmagnetic underlayer and the a-axis lattice constant of the magnetic layer is not larger than 10%.

EXAMPLE 2

A medium of Example 2 was produced in the same manner as in Example 1 except that a nonmagnetic underlayer is comprised of ruthenium and no layer was deposited over the underlayer. A nonmagnetic underlayer 20 nm thick was formed by means of a sputtering method at the deposition rate of 4.2 nm/sec under a discharging argon gas pressure of 70 mTorr. Transmission electron microscope (TEM) observation of the cross section of the produced medium revealed columnar crystals and porous structure in the direction vertical to the substrate. The columnar crystals were observed grown without extraordinary growth such as abnormal expansion during the growth process.

Initial stage of the deposition process did not generate an "initial growth layer". Planar observation was done by the TEM to measure grain sizes. Average grain size was about 6 nm. The distribution of the grain sizes was a normal distribution and the standard deviation was 1.8 nm. Here, the standard deviation in this application document is defined to be a square root of an unbiased dispersion of the distribution.

For the purpose of decreasing grain sizes of the crystalline grains, the deposition rate was controlled at 2.3 nm/sec. The deposition was conducted to the thickness of 20 nm under the discharging argon gas pressure of 70 mTorr. TEM observation of the cross section of the obtained nonmagnetic underlayer film showed porous structure with columnar crystals in the direction vertical to the substrate. The columnar crystals were observed grown without extraordinary growth such as abnormal expansion during the growth process. An "initial growth layer" was not observed in the initial stage of the deposition process. Planar observation was also conducted by the TEM to measure the grain sizes. The average grain size was about 5 nm. Distribution of the grain sizes was a normal distribution with the standard deviation of 1.4 nm.

Thus, reduction of the grain size and improvement of grain size distribution in the underlayer have been accomplished by controlling the deposition rate.

EXAMPLE 3

A medium of Example 3 was produced in the same manner as in Example 2 excluding the deposition process of the nonmagnetic underlayer.

Each of nonmagnetic underlayers of ruthenium was deposited to various thicknesses by a sputtering method at the deposition rate of 4.2 nm/sec under discharging argon gas pressure of 70 mTorr. Grain sizes were measured by a planar image analysis using the TEM for the underlayers with the thicknesses of 5 nm and 50 nm resulting in the average grain sizes of 5 nm and 8 nm, respectively. The both distributions of grain sizes were normal distributions with the standard deviations of 1.4 nm and 2.2 nm, respectively. The cross sectional structure of the both films showed columnar structure and no initial growth layer.

Deposition was conducted under the argon gas pressures of 1.2 times, and 0.7 times above value of 70 mTorr, at the fixed deposition rate of 2.3 nm/sec and with the fixed film thickness of 20 nm. Grain size analysis was made on the planar TEM image. Average grain sizes were 8 nm and 5 nm, respectively. The grain size distribution was a normal distribution in both cases. The standard deviations were 2.4 nm and 1.9 nm, respectively. The observed sectional structure showed columnar structure and no initial growth layer.

Analysis by X-ray diffraction and the TEM was made on the crystal alignment of these nonmagnetic underlayers, and showed that the ruthenium c-axis aligned vertical to the substrate surface. Although clear difference in the alignment corresponding to each deposition condition was not confirmed, deviation of the grain sizes increased due to lattice defects or crystal growth in the cases of thicker film and higher gas pressure.

As described above, it has been confirmed that structure control of the underlayer is possible by controlling film thickness and a gas pressure.

EXAMPLE 4

Examples in Example 4 are magnetic disks fabricated by depositing a cobalt alloy magnetic layer on the examples prepared in Example 2. A granular magnetic layer 20 nm thick was deposited by means of an RF sputtering method using a $Co_{76}Cr_{12}Pt_{12}$ target containing 10 mol % of $SiO_2$, under the discharging argon gas pressure of 5 mTorr on the nonmagnetic underlayer of ruthenium with the 20 nm thickness deposited at the depositing rate of 4.2 nm/sec under the discharging argon gas pressure of 70 mTorr as described in Example 2. After depositing a carbon protective layer 8 nm thick on the magnetic layer, the laminated substrate was taken out from the vacuum chamber. Applying a liquid lubricant to the thickness of 1.5 nm, a magnetic recording medium as shown in FIG. 2 was produced. Substrate heating prior to the deposition process was not executed.

TEM observation on the surface of the magnetic layer of the obtained magnetic recording medium confirmed a granular structure with crystalline grains in the magnetic layer surrounded by nonmagnetic grain boundary region. Lattice image observation revealed that the cobalt alloy grain was crystalline and the grain boundary region was amorphous. Mean distance between the crystalline grains was 1.5 nm and the standard deviation thereof was 2.0 nm. Analysis on the grain size distribution of the magnetic layer of Example 4 indicated a distribution having peaks around 4 nm and 8 nm in the grain size. Average grain size of the crystalline grains was 6 nm and the standard deviation thereof was 2.4 nm. The deviation defined by standard deviation divided by average grain size was 0.4.

TEM observation of sectional structure of the magnetic layer demonstrated continuation of lattice between the nonmagnetic underlayer and the magnetic layer and epitaxial growth of the magnetic layer from the nonmagnetic underlayer. It was also demonstrated that the crystalline phase and the grain boundary phase grew by different mechanisms and have different metallographic textures. Half width $\Delta\theta_{50}$ of the rocking curve of hcp (002) diffraction line of the magnetic layer obtained by X-ray diffraction was 5.2 degree, which confirmed excellent alignment.

Magnetic performances of the magnetic film were measured by the vibrating sample magnetometer (VSM), resulting in the coercive force of 4.9 kOe and the squareness ratio S, which is an index of squareness of M-H hysteresis loop, of 0.9. These values confirmed superior magnetic performances. This large value of the index of squareness (indicating nearly square loop) is a result of reduction in the interaction between magnetic crystalline grains, which is caused by modification of a growth mechanism of the magnetic layer. In the growth mechanism of the magnetic layer in the invention, the magnetic crystalline grains epitaxially grow on the crystalline grains of the ruthenium underlayer having porous structure, the grains of the underlayer being grown without abnormal growth such as unfavorable expansion during the growth process. Each magnetic grain is surrounded by nonmagnetic grain boundary region. Thus, the magnetic grains are grown exhibiting favorable isolation.

EXAMPLE 5

Deposition processes in Example 5 were conducted in the same manner as in Example 4 except that the depositing rate for the nonmagnetic underlayer of ruthenium was controlled to 2.3 nm/sec. Thus, a magnetic recording medium as shown in FIG. 2 was produced. Substrate heating was not conducted.

TEM observation on the surface of the obtained magnetic layer confirmed a granular structure with the crystalline grains of the magnetic layer surrounded by nonmagnetic grain boundary region. Lattice image observation revealed that the cobalt alloy grain was crystalline and the grain boundary region was amorphous. Mean distance between the magnetic crystalline grains was 1.5 nm and the standard deviation thereof was 1.4 nm. Average grain size of the magnetic crystalline grains was 5 nm and the standard deviation thereof was about 1 nm.

Figure 3:
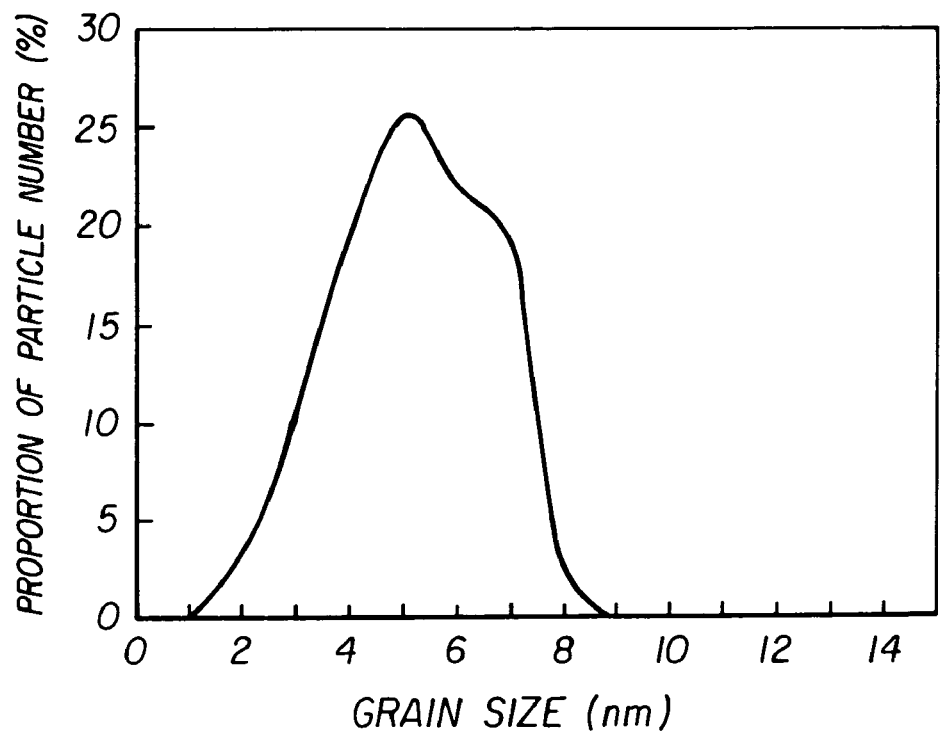
FIG. 3 is a graph showing the grain size distribution of the magnetic crystalline grains in the magnetic layer in Example 5 according to the invention.

FIG. 3 shows a result of the grain size analysis on the magnetic layer of Example 5. The grain size distribution was a normal distribution with the deviation defined by standard deviation divided by average grain size was 0.2.

Figure 4:
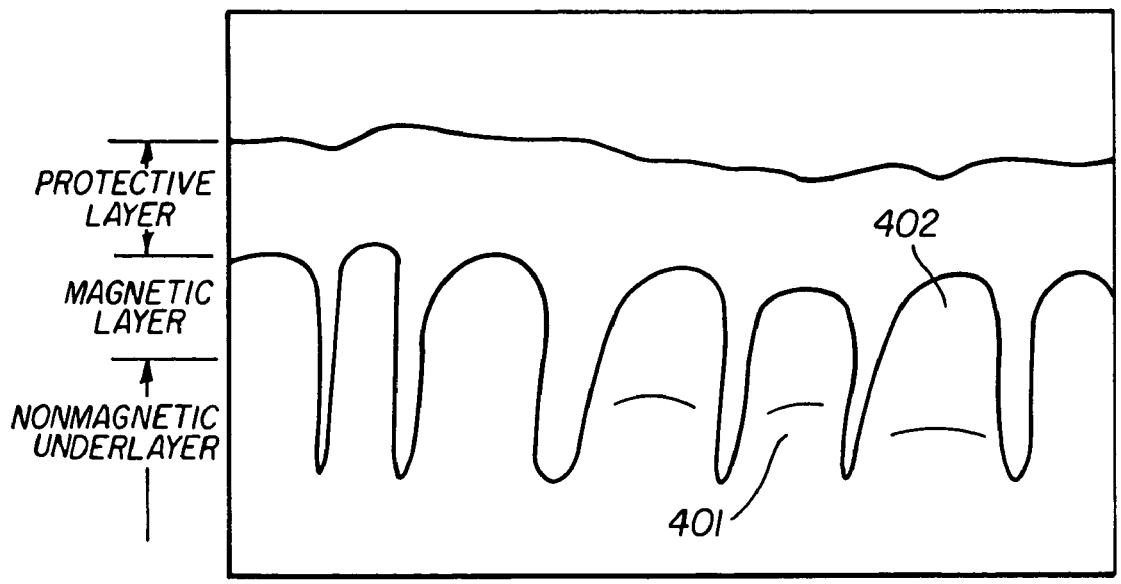
FIG. 4 is a TEM image showing the sectional structure of the magnetic recording medium in Example 5 according to the invention.

FIG. 4 shows a sectional image of the nonmagnetic underlayer and the magnetic layer of a magnetic recording medium of Example 5 obtained by the TEM observation. The TEM observation demonstrated continuation of lattice between the nonmagnetic underlayer 401 and the magnetic layer 402 and epitaxial growth of the magnetic layer from the nonmagnetic underlayer. It was also demonstrated that the crystalline phase and the grain boundary phase grew by different mechanisms and had different metallographic textures. Half width $\Delta\theta_{50}$ of the rocking curve of hcp (002) diffraction line of the magnetic layer 402 obtained by X-ray diffraction was 4.9 degree, which confirmed excellent alignment.

Magnetic performances of the magnetic film were measured by the vibrating sample magnetometer (VSM), resulting in the coercive force, of 5.0 kOe and the squareness ratio S, which is an index of squareness of M-H hysteresis loop, of 0.9. These values confirmed superior magnetic performances. This large value of the index of squareness (indicating nearly square loop) is a result of reduction in the interaction between magnetic crystalline grains, which is caused by modification of a growth mechanism of the magnetic layer reflecting the grain boundary phase of the nonmagnetic underlayer.

EXAMPLE 6

Table 2 shows electromagnetic conversion characteristics of the magnetic recording media of Example 4 and Example 5. The table includes the recording performance of the magnetic disk comprising the magnetic film with the magnetic performances shown in the table. The electromagnetic conversion characteristics are given in the table for comparison of the effect to the media performances resulted from the different way of grain size control between Example 4 and Example 5.

TABLE 2

| underlayer | Hc (Oe) | S | SNR (dB) | noise (µV) |
|---|---|---|---|---|
| Example 4 | 4,920 | 0.92 | 16.0 | 87.5 |
| Example 5 | 5,008 | 0.89 | 17.9 | 65.0 |

The recording performance was obtained by a spinning stand tester using the regeneration output of isolated pulses at the linear recording density of 400 kFCI. The evaluation results indicated that the noise was lowered by 25% and the SNR was raised by 10% in the magnetic recording medium of Example 5 as compared with the magnetic recording medium of Example 4. This improvement can be attributed to the following structural change. As the analysis result of the grain size of the magnetic layer shows, the crystal grains in the nonmagnetic underlayer larger than 8 nm decreased from 30% to 10%. The crystalline grains in the magnetic layer smaller than 4 nm is reduced from 15% to 5%, and the deviation, which is the standard deviation divided by the mean grain size, is suppressed to 0.2. Thus, the noises and the SNR value have been significantly improved.

Because the crystalline grains in the nonmagnetic underlayer larger than 8 nm are liable to separate the magnetic grains that grow on the grains of the underlayer, control of the grain size, its deviation, and segregation in the magnetic layer become difficult. When the proportion of the crystalline grains larger than 8 nm in the nonmagnetic underlayer is reduced to 10% or less, the ratio of the magnetic grains in the magnetic layer that correspond in the one-to-one manner to the crystalline grains in the underlayer increases. The crystal growth in this structure promotes more precise lattice matching and improves lattice matching between the both sides of the interface between the magnetic layer and the nonmagnetic intermediate layer. Besides, segregation structure of the magnetic layer is promoted by the columnar and porous structure of the nonmagnetic underlayer. Therefore, excellent electromagnetic conversion characteristic can be obtained.

As described so far, the magnetic layer in a magnetic recording medium of the present invention has a granular structure consisting of ferromagnetic crystalline grains with the hexagonal closest packed structure and nonmagnetic grain boundary region mainly comprised of oxide surrounding the crystalline grains. The nonmagnetic underlayer is comprised of a metal selected from Ru, Os, and Re, or a substance mainly comprised of one or more element selected from these metals with the hexagonal closest packed structure. The degree of mismatching between a-axis lattice constants of the underlayer and the magnetic recording layer is not more than 10%. By using such materials, excellent magnetic and electromagnetic conversion characteristics can be accomplished.

Because the magnetic layer is epitaxially grown from the underlayer and exhibits favorable alignment, the structure and the grain size of the crystalline grains in the magnetic layer can be controlled by controlling the structure and the grain size distribution in the underlayer. Specifically, the crystal structure of the underlayer is a porous and columnar structure. The proportion of the crystalline grains in the underlayer larger than 8 nm is at most 10% and the standard deviation is at most 1.4 nm. These structures of the invention achieve low noise. In addition, the effect of controlling the structure and the grain size of the magnetic layer can be easily obtained.

The interaction between the magnetic crystalline grains can be reduced by controlling the distance between the crystalline grains in the magnetic film of a medium of the invention. Accordingly, a magnetic recording medium of the invention with minute magnetic grains can yet exhibit enough high coercive force at the room temperature. This achieves stable high density recording with little adverse effect of thermal disturbance.

What is claimed is:

1. A magnetic recording medium for a perpendicular magnetic recording system comprising a nonmagnetic substrate and layers sequentially laminated on the substrate, the layers including
   a seed layer comprising a metal or an alloy with a face centered cubic lattice structure disposed over the substrate,
   a nonmagnetic underlayer comprising a metal or an alloy with a hexagonal closest packed crystal structure,
   a magnetic layer having a granular structure comprised of ferromagnetic crystalline grains with a hexagonal closest packed structure and nonmagnetic grain boundary region of mainly oxide surrounding the ferromagnetic crystalline grains,
   a protective layer, and
   a liquid lubricant layer.

2. A magnetic recording medium according to claim 1, wherein a degree of mismatching between an a-axis lattice constant of the nonmagnetic underlayer and an a-axis lattice constant of the magnetic layer is not larger than 10%, and the underlayer is comprised of a metal selected from Re, Ru, and Os, or an alloy mainly comprised of one or more metals selected from Ru, Os, and Re.

3. A magnetic recording medium according to claim 2, wherein a proportion of crystalline grains larger than 8 nm in the nonmagnetic underlayer is not larger than 10% of whole crystalline grains in the nonmagnetic underlayer, and a standard deviation of the grain sizes of the crystalline grains is at most 1.4 nm.

4. A magnetic recording medium according to claim 1, wherein the seed layer is comprised of a metal selected from Cu, Au, Pd, Pt, and Ir or an alloy mainly comprised of one or more metals selected from Cu, Au, Pd, Pt, and Ir, or an alloy mainly comprised of Ni and Fe.

5. A magnetic recording medium according to claim 2, wherein the seed layer is comprised of a metal selected from Cu, Au, Pd, Pt, and Ir or an alloy mainly comprised of one or more metals selected from Cu, Au, Pd, Pt, and Ir, or an alloy mainly comprised of Ni and Fe.

6. A magnetic recording medium according to claim 3, wherein the seed layer is comprised of a metal selected from Cu, Au, Pd, Pt, and Ir or an alloy mainly comprised of one or more metals selected from Cu, Au, Pd, Pt, and Ir, or an alloy mainly comprised of Ni and Fe.

7. A magnetic recording medium according to claim 1 further comprising a nonmagnetic alignment control layer under the seed layer and being comprised of a metal or an alloy with a body centered cubic crystal structure or an amorphous structure.

8. A magnetic recording medium according to claim 7, wherein the nonmagnetic alignment control layer is comprised of a nonmagnetic metal selected from Nb, Mo, Ta, and W or an alloy mainly comprised of one or more metals selected from Nb, Mo, Ta, and W.

9. A magnetic recording medium according to claim 2 further comprising a nonmagnetic alignment control layer under the seed layer and being comprised of a metal or an alloy with a body centered cubic crystal structure or an amorphous structure.

10. A magnetic recording medium according to claim 9, wherein the nonmagnetic alignment control layer is comprised of a nonmagnetic metal selected from Nb, Mo, Ta, and W or an alloy mainly comprised of one or more metals selected from Nb, Mo, Ta, and W.

11. A magnetic recording medium according to claim 3 further comprising a nonmagnetic alignment control layer under the seed layer and being comprised of a metal or an alloy with a body centered cubic crystal structure or an amorphous structure.

12. A magnetic recording medium according to claim 11, wherein the nonmagnetic alignment control layer is comprised of a nonmagnetic metal selected from Nb, Mo, Ta, and W or an alloy mainly comprised of one or more metals selected from Nb, Mo, Ta, and W.

13. A magnetic recording medium according to claim 4 further comprising a nonmagnetic alignment control layer under the seed layer and being comprised of a metal or an alloy with a body centered cubic crystal structure or an amorphous structure.

14. A magnetic recording medium according to claim 13, wherein the nonmagnetic alignment control layer is comprised of a nonmagnetic metal selected from Nb, Mo, Ta, and W or an alloy mainly comprised of one or more metals selected from Nb, Mo, Ta, and W.

15. A magnetic recording medium according to claim 5 further comprising a nonmagnetic alignment control layer under the seed layer and being comprised of a metal or an alloy with a body centered cubic crystal structure or an amorphous structure.

16. A magnetic recording medium according to claim 15, wherein the nonmagnetic alignment control layer is comprised of a nonmagnetic metal selected from Nb, Mo, Ta, and W or an alloy mainly comprised of one or more metals selected from Nb, Mo, Ta, and W.

17. A magnetic recording medium according to claim 6 further comprising a nonmagnetic alignment control layer under the seed layer and being comprised of a metal or an alloy with a body centered cubic crystal structure or an amorphous structure.

18. A magnetic recording medium according to claim 16, wherein the nonmagnetic alignment control layer is comprised of a nonmagnetic metal selected from Nb, Mo, Ta, and W or an alloy mainly comprised of one or more metals selected from Nb, Mo, Ta, and W.

* * * * *